United States Patent [19]
Leff et al.

[11] Patent Number: 4,761,633
[45] Date of Patent: Aug. 2, 1988

[54] COMMUNICATION AID

[76] Inventors: Ruth B. Leff; Aaron N. Leff, both of 6589 N. Crestwood Dr., Milwaukee, Wis. 53209

[21] Appl. No.: 935,048
[22] Filed: Nov. 26, 1986
[51] Int. Cl.⁴ .............................................. G09B 21/00
[52] U.S. Cl. ................................ 340/286 R; 116/334; 116/DIG. 46; 434/112
[58] Field of Search .............. 340/407, 815.08, 286 M, 340/128, 286 R; 434/112, 402, 404, 198, 208, 304, 403; 116/316–319, 284, 301, 309, 328, 334, DIG. 46; 40/1, 5, 490, 491, 611

[56] References Cited

U.S. PATENT DOCUMENTS

| | | | |
|---|---|---|---|
| 944,665 | 12/1909 | Coe | 340/286 R |
| 1,980,794 | 11/1934 | Gebler | 340/128 |
| 2,011,983 | 8/1935 | Rodde | 340/128 |
| 2,576,608 | 11/1951 | Kramer | 434/404 X |
| 3,651,512 | 3/1972 | Summers | 340/286 |
| 3,732,632 | 5/1973 | Dyer | 434/198 |
| 4,165,890 | 8/1979 | Leff | 283/7 |
| 4,184,277 | 1/1980 | Larin | 40/490 X |
| 4,306,368 | 12/1981 | Coghill et al. | 434/112 X |
| 4,465,465 | 8/1984 | Nelson | 434/112 |

*Primary Examiner*—Joseph A. Orsino
*Assistant Examiner*—Brian R. Tumm
*Attorney, Agent, or Firm*—Andrus, Sceales, Starke & Sawall

[57] ABSTRACT

A communication or educational aid comprising a housing having a generally flat surface, and a pointer is mounted for rotation on the surface. A pair of spaced guides are located on the surface and a panel or overlay containing a plurality of symbols, such as letters, words, pictures, or the like, is mounted in the guides and is provided with a slot which registers with the shaft of the pointer. The pointer is rotated by depressing a push button operating through an electrical circuit to thereby bring the pointer into registry with one of the symols on the panel.

7 Claims, 1 Drawing Sheet

COMMUNICATION AID

BACKGROUND OF THE INVENTION

Handicapped patients, such as those being unable to speak, have difficulty communicating their basic needs to others. In order to aid a handicapped person in communicating his or her basic needs, it has been proposed to utilize a series of pictures or illustrations representing basic needs which are joined together on a ring. By selecting the proper illustration, the patient can communicate to others. Devices of this type can be helpful for people with communication difficulties, multiple sclerosis or other neurological disorders, mental retardation, voice, hearing or visual difficulties, or post operative problems.

Another form of communication aid to be utilized by patients unable to verbally communicate and also unable to move their arms or head is a communication board, as disclosed in U.S. patent application Ser. No 06/769,385, filed Aug. 26, 1985 now abandoned. In accordance with that device, a series of words or illustrations representing the needs of a patient are mounted on a transparent board around a center hole or opening. An operator, holding the board and looking through the opening can follow eye movement of the patient toward one of the illustrations on the board to thereby determine the need of the patient. In another form of the communication device, as disclosed in the aforementioned patent application, a light beam is mounted on the visor of a cap to be worn by the patient, and through head movement, the patient can direct the beam to an illustration on a board to represent the need.

SUMMARY OF THE INVENTION

The invention is directed to a communication aid having particular use for handicapped patients who have movement of their arms or legs, but are unable to verbally communicate. In accordance with the invention, the communication aid comprises a housing having a generally flat surface with a rotary pointer mounted for rotation on the surface. A pair of guides are mounted in spaced relation on either side of the pointer and a panel or overlay is mounted within the guides and bears a plurality of words, letters or illustrations. The panel is provided with a slot which extends from an edge of the panel to the center and receives the shaft of the pointer as the panel is inserted in the guides.

A push button is mounted on the housing and by depressing the button an electric circuit is energized to rotate the pointer and bring the pointer into registry with one of the illustrations on the panel to represent the need of the patient. The patient, using a finger or toe, can depress the push button to rotate the pointer and designate the need.

In an alternate form of the invention, a remote control switch can be employed which is connected to a jack in the housing to operate the pointer.

While the invention has particular use as a communication aid for handicapped persons, it can also be used as an educational aid for teaching or educational testing purposes.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
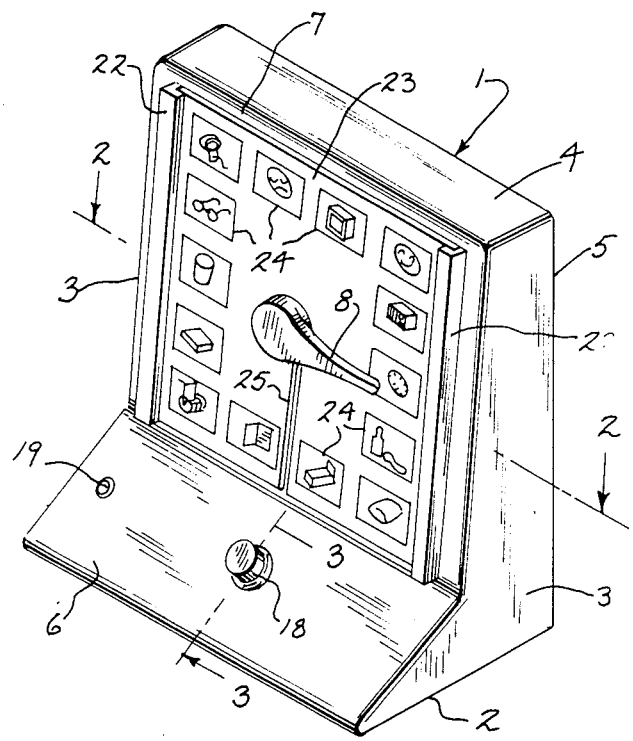
FIG. 1 is a perspective view of the device of the invention.

FIG. 1 shows a communication aid comprising a housing 1 including a base 2, and a pair of vertical side walls 3 which are connected together by a top 4. In addition, housing 1 includes a back wall 5, a lower sloping front wall 6, and a generally vertical upper front wall 7.

Mounted for rotation centrally of front wall 7 is a pointer 8 which is carried by a shaft 9 driven by motor 10.

Figure 3:
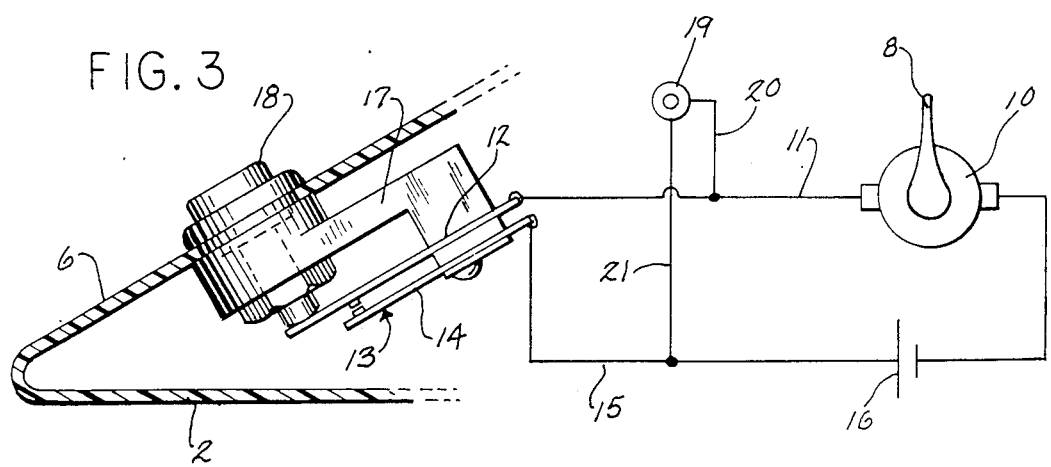
FIG. 3 is a fragmentary section taken along line 3—3 of FIG. 1 and showing the electrical circuit in schematic form.

As shown schematically in FIG. 3, motor 10 is connected through lead 11 to a flexible contact arm 12 of switch 13 which is located beneath sloping wall 6. Switch 13 also includes a second contact 14 which is connected by lead 15 through battery 16 to motor 10. Contacts 12 and 14 are mounted on a bracket 17 which is attached to the undersurface of wall 6.

Switch 13 also includes a push button 18 which projects outwardly of surface 6 and the inner end of push button 18 is in engagement with contact 12. By depressing push button 18, contact arm 12 will be deflected into engagement with contact 14 to close the circuit to motor 10 and thereby cause the pointer to rotate on the wall 7.

As an alternate method of rotating the pointer, a jack 19 is located on wall 6 and jack 19 is connected by leads 20 and 21 to leads 11 and 15 respectively. A remotely located switch, not shown, can be connected to jack 19, so that the pointer can then be rotated from a remote location.

Figure 2:
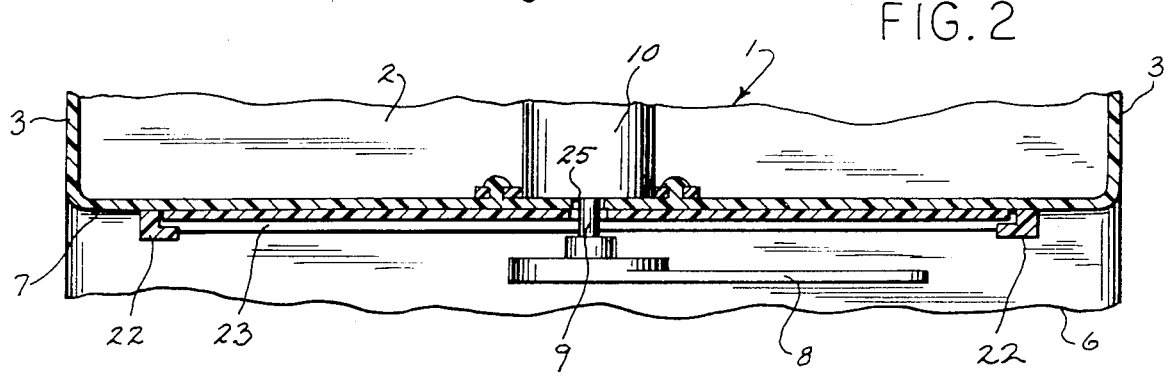
FIG. 2 is a fragmentary horizontal section taken along line 2—2 of FIG. 1.

As best shown in FIGS. 1 and 2, guides 22 are mounted along the side edges of the front panel 7 and a panel or overlay 23 is received within the guides. As shown in FIG. 1, a series of illustrations 24, which can be pictures, words, letters, or other indicia, are applied to the panel 23 in a pattern around the pointer 8. As shown in FIGS. 1 and 2, the lower edge of panel 23 is formed with a slot 25 which receives the shaft 9 of the pointer, as the panel is inserted into the guides 22. Slot 25 extends from the lower edge of panel 23 to the center thereof.

The patient by depressing push button 18 with a finger or toe, can rotate pointer 8 and bring the pointer into registry with one of the illustrations 24 to indicate his or her need or want. The indicia 24, in some cases may take the form of letters of the alphabet, or words, or in other situations, as shown in FIG. 1, the illustrations can be pictures representing basic needs of the patient, such as, for example, eyeglasses, wheelchair, bed, etc.

While the communication aid of the invention has particular use for people who are unable to communicate, it can also be used as a basic educational aid or for educational testing purposes.

A number of different panels 23 can be utilized, each bearing different illustrations, so that by substituting panels, a wide variety of illustrations are available to the patient.

Various modes of carrying out the invention are contemplated as being within the scope of the following claims particularly pointing out and distinctly claiming the subject matter which is regarded as the invention.

We claim:

1. A communication aid for a patient, comprising a housing having a surface, a rotatable pointer mounted on a shaft, guide means on said surface, and a panel mounted on said guide means and bearing a plurality of symbols, said panel having a slot to receive said shaft, said pointer being rotatable to bring the pointer into registry with one of said symbols.

2. The communication aid of claim 1, wherein said symbols comprise illustrations representing the basic needs of a patient.

3. The communication aid of claim 1, wherein said slot extends from an edge of the panel inwardly toward the center of the panel.

4. A communication aid for a person, comprising a housing having a surface, a pointer mounted for rotation on said surface, a pair of generally parallel guide members disposed on opposite sides of said pointer, a panel having a pair of opposed side edges slidably mounted in said guide members and having a slot disposed parallel to said side edges and extending from an edge of said panel toward the center, said slot receiving a shaft of said pointer, a plurality of indicia located on the panel and arranged in a pattern to be individually designated by the pointer, and drive means for rotating the pointer to bring the pointer into registry with one of said indicia to indicate the need of the person.

5. The communication aid of claim 4, wherein said drive means includes an operating member mounted on the housing, and electrical circuit means connecting said operating member and said pointer.

6. The communication aid of claim 5, wherein said operating member comprises a push button mounted on the housing.

7. The communication aid of claim 4, wherein said pointer is located centrally of said panel and said indicia are circumferentially disposed around said pointer.

* * * * *